ALFRED D. SCARBROUGH, INVENTOR
BY [signature]
ATTORNEY

Feb. 23, 1960 A. D. SCARBROUGH 2,926,341

AUTOMATIC TIMING TRACK RECORDING APPARATUS

Filed Feb. 1, 1956 4 Sheets-Sheet 2

ALFRED D. SCARBROUGH,
INVENTOR

BY [signature]
ATTORNEY

ALFRED D. SCARBROUGH,
INVENTOR
BY Edwin M. Martin
ATTORNEY

ALFRED D. SCARBROUGH,
INVENTOR
BY [signature]
ATTORNEY

United States Patent Office 2,926,341

Patented Feb. 23, 1960

2,926,341

AUTOMATIC TIMING TRACK RECORDING APPARATUS

Alfred D. Scarbrough, Los Angeles, Calif., assignor to Hughes Aircraft Company, Culver City, Calif., a corporation of Delaware Application February 1, 1956, Serial No. 562,683

6 Claims. (Cl. 340—174)

This invention relates to recording apparatus and more particularly to an apparatus for recording a continuous timing track of a predetermined number of uniformly spaced clock pulses on a recording channel of a computer memory drum.

In certain of its aspects this invention relates to a copending application of D. L. Curtis, Serial No. 558,990, filed January 13, 1956, entitled "Timing Track Recording Apparatus" and assigned to the assignee of this invention.

In certain digital computing machinery all operations are timed or synchronized by clock or timing signals which are essentially uniformly spaced electrical pulses. In order to insure reliable operation of a digital computer, it is essential that the clock pulses be of constant amplitude, be accurately and uniformly spaced and thus free from time modulation, and in addition do not contain transient and spurious signals.

In a digital computer employing a rotating drum-type memory, it is conventional and highly convenient to reserve a memory channel on the drum for recording a timing track of uniformly spaced clock pulses. To accomplish this, either a rectangular or sine wave signal of constant frequency is initially recorded on the channel which, when reproduced, will provide uniformly spaced clock pulses for synchronizing the other operations of the computer.

Although this method of providing clock pulses is highly efficient in theory since the digital computer thereby supplies its own synchronizing signals which are synchronized with the rotation of the drum, such difficulty has been encountered in the past in accurately and reliably recording the timing track on the drum. Among the most serious problems encountered are the difficulty of recording precisely uniformly spaced sine or rectangular wave signals to produce a timing track of the exact desired number of cycles with accurate in-phase overlap between the origin and terminal end of the timing track without the introduction of transient or other spurious undesired signals.

Although it is possible to utilize a crystal-controlled oscillator as a source of constant frequency signals for recording on the timing track of the drum, it is extremely difficult to maintain the angular velocity of the rotating drum sufficiently constant to accurately record the desired signal. Even a momentary slight variation in angular velocity of the drum will cause out-of-phase overlapping of the recorded timing track, thus resulting in a discontinuous track. For the same reason it is difficult to record a timing track having precisely the desired number of recorded pulses around the circumference of the timing track channel.

It is apparent, therefore, that in order to accurately and reliably record a timing track on the rotating memory drum of a digital computer, the frequency of the signals being recorded on the channel must be regulated at all times in accordance with the instantaneous angular velocity of the drum itself. In other words, there must be an interdependent relationship between the angular velocity of the rotating drum and the frequency of the signals being recorded on the timing track. Such a relationship has been attempted in the past by various mechanical and electromechanical systems for linking the angular motion of the drum with the signal source utilized for recording the timing track. Most prominent among these systems have been the etching or grooving system, the toothed-wheel system, and the crystal controlled oscillator synchronous-motor system.

The etching or grooving system, as the name implies, attempts to synchronize the frequency or repetition rate of the signals recorded on the timing track with the rotational velocity of the drum by directly etching or grooving a timing track on the drum. This is accomplished by either etching or cutting a series of slots around the periphery of the drum thereby producing a variable magnetic reluctance path to serve as a timing track. When the drum is rotated, a magnetic reading head is stationed above the surface of the timing track for producing electrical clock pulse signals corresponding to the variable reluctance path of the etched or machined timing track. In addition to the laborious nature of the etching or machining process, this method has many other inherent disadvantages, among which are the mechanical errors introduced in machining or etching the grooves and the inability to readily vary the number of clock pulses recorded on the timing track.

In the toothed-wheel system, signals for recordation on the timing track are derived from a toothed wheel which is mechanically coupled to the revolving drum and rotated thereby. Electrical signals for recording the timing track on the drum are derived from a magnetic reading head stationed near the peripheral surface of the toothed wheel, an electrical signal being produced by the head upon passage of each tooth of the wheel in proximity of the reading head. Although this system has the advantage of permitting a selection of the number of pulses recorded on the timing track of the drum by exchanging wheels containing a different number of teeth, this system is subject to errors introduced by the mechanical play inherent in all known mechanical coupling devices. For example, the play inherent in the mesh of even a high precision gear train is sufficient to introduce considerable time modulation in a series of pulses produced by this system. In addition, the play in the coupling means employed causes an in-phase overlapping of the timing track produced to be a result of chance rather than be a certainty. It will be apparent that if the toothed wheel is directly coupled to the revolving drum in order to eliminate coupling errors the system becomes tantamount to the grooving system previously discussed.

In the crystal controlled oscillator synchronous-motor system, a common signal source is utilized for controlling both the speed of rotation of the memory drum and the frequency or repetition rate of the signals recorded on the timing track of the drum. In practice, constant frequency signals are produced by a crystal controlled oscillator serving as a signal source. These signals are amplified and utilized for energizing a synchronous motor and also for recording clock pulses on the timing track of the drum. The drum is directly coupled to the synchronous motor and rotated thereby. In this manner the rotational velocity of the drum and the frequency of the signals recorded on the timing track are both controlled from a common primary source.

In actual practice, the crystal controlled oscillator synchronous-motor system has certain inherent disadvantages. Any variation in the frequency of the signals from the primary signal source will be instantaneously effective to alter correspondingly the frequency of the signals recorded on the timing track of the drum. Due to the relatively large inertia of the drum, however, a time lag occurs between changes in frequency of the primary source and any corresponding change in angular velocity of the drum. This not only results in temporarily erratic recording of the timing track but starts a hunting effect wherein the motor and drum attempt to maintain an angular velocity corresponding to the frequency of the primary signals. Although it is theoretically possible to minimize this hunting effect by utilizing a sufficiently large synchronous motor, the resulting system becomes large and inefficient since the advantages of utilizing the synchronous motor no longer apply after the timing track is recorded and the drum is revolved for other operations of the digital computer.

It is therefore an object of the present invention to provide an improved timing track recording apparatus for recording a timing track of any desired number of clock pulses with in-phase overlap on a rotating recording drum.

It is also an object of the present invention to provide a timing track recording apparatus of the type referred to that is completely automatic.

A further object of the present invention is to provide a timing track recording apparatus of the type referred to that is free from mechanical errors.

A still further object of the present invention is to provide a timing track recording apparatus of the type referred to which is rapid, accurate and reliable in operation.

It is another object of the present invention to provide a timing track recording apparatus of the class referred to that will record a timing track free from time modulation irrespective of variations of the angular velocity of the drum.

In accordance with the basic concepts of the present invention, a timing track having N desired clock pulses with in-phase overlap is obtained on a rotating magnetic memory drum by continually recording timing signals or clock pulses from a signal source on a timing track of the drum in a manner whereby each pulse as it is recorded erases any previously recorded pulse on the same spot of the timing track. The frequency or repetition rate of the clock pulses generated by the source and recorded on the drum is first automatically adjusted to cause exactly N clock pulses to be recorded on the timing track during each revolution of the drum. At the completion of each revolution of the drum, the continuity or overlap phase characteristic of the timing track recorded during the revolution is then checked until an in-phase overlap is obtained for two consecutive revolutions of the drum. When this has been achieved, the recording of the timing track is automatically interrupted to obtain the desired timing track of N clock pulses with in-phase overlap.

The above process is accomplished by utilizing an origin or revolution pulse which is generated at the completion of each revolution of the drum. The repetition rate of every Nth clock pulse being recorded on the rotating drum is compared with the repetition rate of the origin pulses. As a result of the above comparison process, a correction voltage is developed having an amplitude and polarity equal to the magnitude and sense of the difference between the repetition rate of the origin pulses and the repetition rate of the Nth clock pulses. This correction voltage is applied to the clock pulse source in a manner to cause the source to alter the frequency of the clock pulses proportional to the amplitude and polarity of the correction voltage thereby to produce every Nth clock pulse at the same repetition rate as the repetition rate of the origin pulses.

When the frequency of the clock pulses has been adjusted by the above process to obtain exactly N clock pulses on the timing track during each revolution of the drum, the continuity or in-phase overlap characteristic of the timing track recorded on the drum during each revolution is then determined by comparing the phase relationship of each origin pulse with a corresponding clock pulse. When two consecutive origin pulses occur in time coincidence with two corresponding clock pulses, the recording of the timing track is automatictlly interrupted to preserve the previously recorded continuous timing track of N clock pulses with in-phase overlap.

In its basic structural form, the timing track recording apparatus of the present invention comprises a drum revolution indicator, a signal generator, an automatic frequency control circuit, a coincidence detection circuit, and a pulse recording circuit. The drum revolution indicator is coupled to the rotating magnetic drum in a manner to produce an origin pulse once during each revolution of the drum signalling the instant of completion of each revolution. The signal generator continuously generates clock pulses and in response to a correction voltage applied thereto alters the repetition rate of the clock pulses in accordance with the amplitude and polarity of the correction voltage. The frequency control circuit is coupled to the drum revolution indicator and the signal generator for receiving the origin pulses and the clock pulses and for developing the correction voltage at an amplitude and polarity equal to the magnitude and sense, respectively, of the difference between the repetition rate of the origin pulses and the repetition rate of every Nth pulse of the clock pulses.

Since this correction voltage is impressed on the signal generator, the signal generator is caused to alter the repetition rate of the clock pulses to produce exactly N clock pulses during each revolution of the drum. These clock pulses are continuously recorded on the rotating drum by the pulse recording circuit.

The coincidence detection circuit compares the phase relationship of each origin pulse with a corresponding clock pulse and produces an in-phase control signal which is impressed on the recording circuit when there occurs an in-phase coincidence between two consecutive origin pulses and two corresponding clock pulses. The pulse recording circuit interrupts the recording of clock pulse signals in response to the in-phase signal produced by the coincidence detection circuit to preserve the previously recorded continuous timing track of N clock pulses with in-phase overlap.

The novel features which are believed to be characteristic of the invention, both as to its organization and method of operation, together with further objects and advantages thereof, will be better understood from the following description considered in connection with the accompanying drawings in which one embodiment of the invention is illustrated by way of example. It is to be expressly understood, however, that the drawings are for the purpose of illustration and description only, and are not intended as a definition of the limits of the invention.

Figure 1:
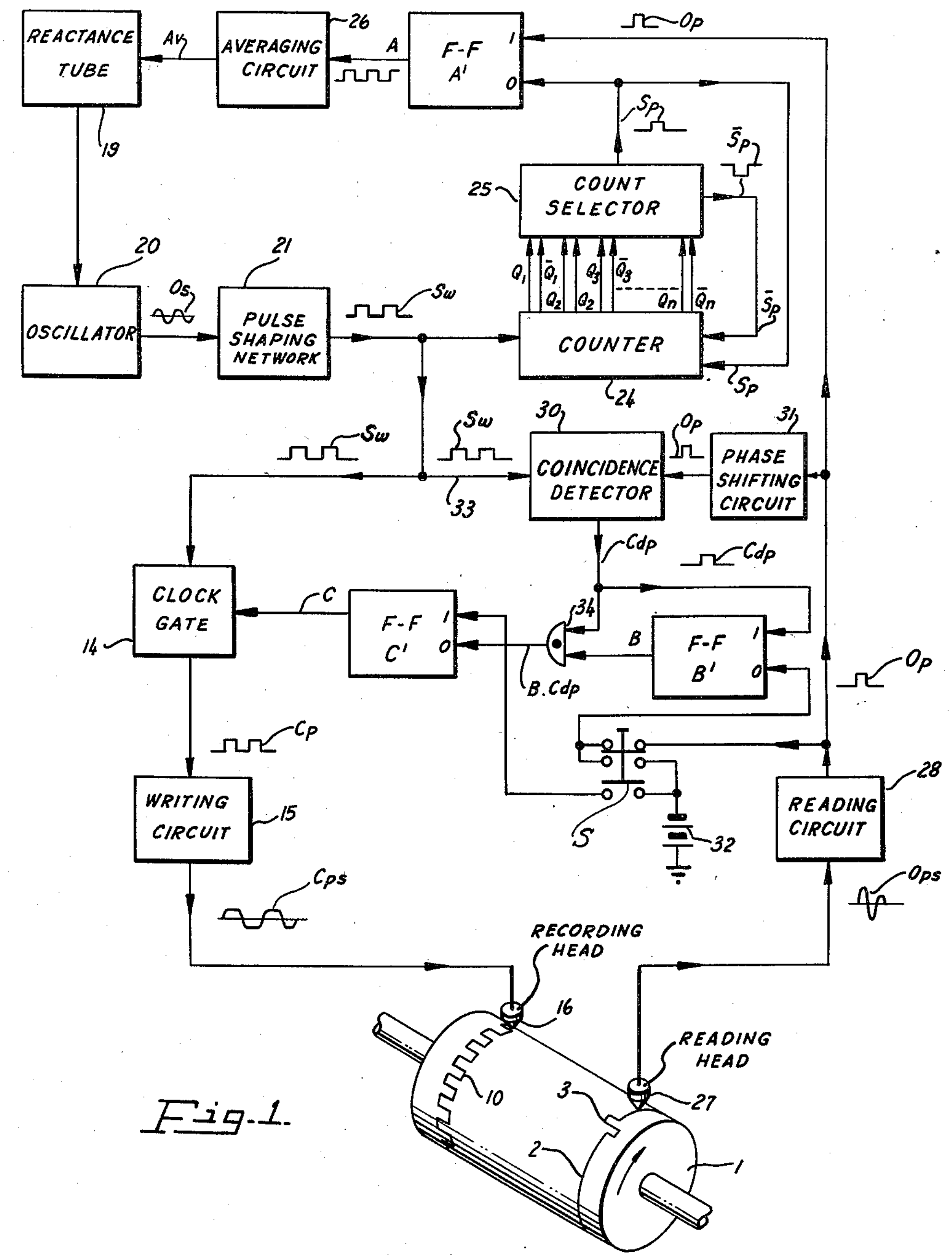
Fig. 1 is a schematic diagram in block form of an embodiment of the recording apparatus of the present invention.

Reference is now made to Fig. 1 wherein there is presented in schematic block form an embodiment of the apparatus of the present invention adapted for accurately recording a timing track 10 of any desired number N clock pulses around the periphery of a magnetic memory drum 1 which is continuously rotating in the direction indicated by the arrow, by a driving source not shown. The signals recorded on timing track 10 of drum 1 originate in the form of square-topped pulses $S_w$ produced by a signal generator comprised of a reactance tube 19, an oscillator 20, and a pulse shaping network 21. Oscillator 20 continuously generates sine waves $O_s$ at an arbitrary frequency which are impressed on pulse shaping network 21. In response thereto, pulse-shaping network 21 produces square-topped pulses $S_w$ having a frequency or repetition rate coincident with sine waves $O_s$. Reactance tube 19 is coupled to oscillator 20 and responsive to a correction voltage $A_v$ for altering the frequency of sine waves $O_s$, thereby correspondingly altering the repetition rate of square-topped pulses $S_w$, in accordance with the polarity and magnitude of correction voltage $A_v$. In a manner to be explained, correction voltage $A_v$ is developed at the proper amplitude and polarity to cause the repetition rate of pulses $S_w$ to be altered from their original arbitrary rate to a regulated rate such that exactly N square-topped pulses $S_w$ are produced by the signal generator during each revolution of drum 1.

Square-topped pulses $S_w$ are recorded on drum 1 to form the desired timing track 10 by a recording circuit comprised of a clock gate 14, a writing circuit 15, and a recording head 16. Square-topped pulses $S_w$ are impressed on clock gate 14 which, in response to control signals C, selectively gates pulses $S_w$ to produce clock pulses $C_p$ which are impressed on writing circuit 15 to produce clock-pulse current signals $C_{ps}$. As is more fully explained in the ensuing discussion, control signals C are two-level signals having a first level when clock-pulse current signals $C_{ps}$ are recorded on timing track 10 of drum 1 with in-phase overlap, and having a second level at all other times. Clock gate 14 blocks pulses $S_w$ in response to first level signals C and gates pulses $S_w$ to produce clock pulses $C_p$ in response to second level signals C. Writing circuit 15, in response to pulses $C_p$ produces clock-pulse current signals $C_{ps}$ which are magnetically recorded on timing track 10 of drum 1 by recording head 16.

The circuit of Fig. 1 described thus far relates to that portion of the recording apparatus of the present invention for generating and recording rectangular clock pulses on timing track 10 of drum 1. Assuming that magnetic drum 1 is rotated at a substantially constant angular velocity, it is evident from the previous discussion that the number of clock pulses recorded on drum 1 during any particular revolution of the drum will be directly dependent upon the relative frequency of sine waves $O_s$ produced by oscillator 20 and the angular speed of the drum. It remains, therefore, to consider the elements of the timing track recording apparatus of Fig. 1 which are utilized to produce the correction voltage $A_v$ and the control signal C. As previously mentioned, correction voltage $A_v$ is utilized for adjusting the frequency of sine waves $O_s$ to cause exactly N pulses $S_w$ to be generated during each revolution of drum 1. Control signal C is developed by those parts of the present invention utilized for determining the continuity or overlap characteristic of the timing track recorded on drum 1 during each revolution of the drum to produce control signals C of the proper level to close clock gate 14 when an in-phase overlap is obtained thereby preserving a previously recorded timing track on the drum of exactly N clock pulses with in-phase overlap.

In order to time the operation of the remaining portions of the circuit of Fig. 1 with the rotation of drum 1, a drum revolution indicator is provided by magnetically recording a single pulse symbolically indicated at 3 on an origin pulse channel 2 of the drum. Pulse 3 is read by a magnetic reading head 27 which produces an origin pulse signal $O_{ps}$ once each revolution of the drum. Origin pulse signals $O_{ps}$ are impressed on a reading circuit 28 for amplifying and shaping signals $O_{ps}$ during each revolution of the drum indicating the instant of completion of each revolution.

Correction voltage $A_v$ is developed by an automatic frequency control circuit comprising a counter 24, a count selector 25, a bistable flip-flop A′, and an averaging circuit 26. Square-topped pulses $S_w$ are impressed on counter 24, which in response thereto, counts the pulses $S_w$ and produces complementary pairs of binary or two-level output signals $Q_1, \bar{Q}_1; Q_2, \bar{Q}_2; Q_3, \bar{Q}_3; \ldots Q_n, \bar{Q}_n$ indicating the count contained in counter 24 in a true binary or a binary-coded numbering system. Count selector 25 is coupled to counter 24 and responsive to count signals $Q_1, \bar{Q}_1$ to $Q_n, \bar{Q}_n$ produced by counter 24, for producing complementary pairs of count selection pulses $S_p$ and $\bar{S}_p$ whenever counter 24 registers a count of N. More specifically, count selector 25 is adjustable in a manner to be described, to produce output signals $S_p$ and $\bar{S}_p$ at any desired count of counter 24 as indicated by count signal $Q_1, \bar{Q}_1$ to $Q_n, \bar{Q}_n$. In operation, therefore, count selector 25 is adjusted to produce signals $S_p$ and $\bar{S}_p$ at every Nth count of counter 24, i.e., at every Nth count of pulses $S_w$ impressed thereon.

Signals $S_p$ and $\bar{S}_p$, produced by count selector 25 are impressed on counter 24, for resetting counter 24 to a zero count. Counter 24, therefore, may be any conventional electronic counter capable of counting signal $S_w$ impressed thereon and producing complementary pairs of binary two-level output signals indicating the count contained in the counter, with the additional feature that counter 24 be reset to zero whenever complementary signals $S_p$ and $\bar{S}_p$ are impressed thereon.

As is well known in the art, binary electrical signals are utilized to represent the binary digits 1 and 0 and are conventionally characterized in the digital computer art as two-level voltage signals having either a relatively high voltage level or a relatively low voltage level. For purposes of convenience only, a relatively high binary signal will herein be referred to as a 1-level signal representing a binary 1 digit, and a relatively low binary signal as a 0-level signal representing a binary 0 digit. In order to avoid possible confusion, it should be further understood at the outset that a binary signal or variable as herein used indicated by a symbol with a bar ( ‾ ) over the symbol indicates the complement of the signal or variable. Accordingly, a binary signal represented by a symbol with a bar ( ‾ ) over the symbol is at all times at the opposite voltage level as the signal represented by the same symbol without the bar ( ‾ ).

Selection signals $S_p$ produced by count selector 25 and origin pulses $O_p$ produced by the drum revolution indicator of the present invention are impressed on the zero and the one inputs, respectively, of bistable flip-flop $A_1'$ which produces binary or two-level voltage output signals A which are impressed on averaging circuit 26. Averaging circuit 26, in response to binary voltage signals A impressed thereon produces the correction voltage $A_v$ having an amplitude and polarity at any instant equal to the magnitude and direction of deviation of the average value of signals A.

Flip-flop A′, similar to the remaining flip-flop circuits hereinafter discussed, is a conventional bistable flip-flop having 1 and 0 input circuits and producing complementary binary or two-level output signals A and $\bar{A}$, representing the stable state of the flip-flop. More specifically, a flip-flop of this class is characterized by producing a 1-level A and a 0-level $\bar{A}$ output signal when in one of its stable states, and a 0-level A and a 1-level $\bar{A}$ output signal when in its other stable state. Since, however, only output signals A of flip-flop A' are utilized in the apparatus of Fig. 1, output signals $\bar{A}$ of the flip-flop are not shown in the figure.

It is convenient to consider one of the complementary output signals of a flip-flop as the "true" output signal of the flip-flop and the other output signal of the flip-flop as the "true-complement" output signal. In accordance with this convention, the true output signal is indicated by a symbol without a bar ( $\bar{}$ ) over the signal, and the true-complement output signal by the same symbol with the bar ( $\bar{}$ ). Although available for use, the true-complement output signals of the remaining flip-flops illustrated in Fig. 1 are not utilized, the outputs for the flip-flops indicated representing only the true outputs of the respective flip-flops. As will be fully explained later on, however, circuits utilizing both the true and true-complement output signals of flip-flops are included in certain parts of the circuitry of Fig. 1.

In order to provide terminology for identifying the stable states of a conventional bistable flip-flop of this class, the stable state of a flip-flop characterized by a 1-level true output signal will hereinafter be referred to arbitrarily as the 1-representing state and the opposite state characterized by a 0-level true output signal will be referred to as the 0-representing state.

A conventional bistable flip-flop, such as flip-flop A of Fig. 1 is further characterized by assuming the 1-representing state in response to a pulse applied to the 1 input of the flip-flop, and conversely by assuming the 0-representing state when a pulse is applied to the 0 input of the flip-flop. Thus flip-flop A' will assume a 1-representing state in response to each origin pulse $O_p$ impressed on the 1 input of the flip-flop, and will assume the 0-representing state in response to each selection pulse $S_p$ impressed on the 0 input of the flip-flop. It should also be understood at this time that a flip-flop of this class is triggered to its opposite state, when pulses are simultaneously applied to both the 1 and the 0 inputs of the flip-flop. Thus the simultaneous application of an origin pulse $O_p$ and a selection pulse $S_p$ to the 1 and 0 inputs of flip-flop A' will cause the flip-flop to be triggered to its opposite state. Typical flip-flops of the above class are illustrated and described in detail in U.S. Patent No. 2,644,887 entitled "Synchronizing Generator," by A. E. Wolfe, Jr., issued July 7, 1953.

Averaging circuit 26 may be any conventional filtering circuit for receiving binary signals A and for producing a voltage $A_v$ representing the agerage value, in magnitude and polarity, of signals A. Correction voltage $A_v$, therefore, will have a zero value only when signals A are symmetrical signals having 1-level values and 0-level values for equal intervals of time, i.e., when the average value of signals A is zero. Whenever signals A are asymmetrical, on the other hand, averaging circuit 26 develops correction voltage $A_v$ at an amplitude and polarity corresponding to the average value of the signals. For example, when the average of the 1-level periods of signals A is greater than the average of the 0-level periods of the signals, correction voltage $A_v$ will have a positive polarity and a magnitude proportional to the difference between the two averages and vice versa.

Correction voltage $A_v$ is fed to reactance tube 19 in a manner to cause oscillator 20 to increase the frequency of sine wave $O_s$ when correction voltage $A_v$ has a positive polarity and to decrease the frequency of waves $O_s$ when correction voltage $A_v$ has a negative polarity. In either case the frequency of signal $O_s$ is changed in magnitude by a quantity proportional to the amplitude of the correction voltage $A_v$. A reactance tube controlled oscillator circuit of the above class is fully described and illustrated in "Theory and Applications of Electron Tubes" by Herbert J. Reich, McGraw-Hill Book Company, Inc., New York 1944, pages 331 to 337.

From the foregoing discussion, it is apparent that if origin pulses $O_p$ have a repetition rate less than that of selection pulse $S_p$, indicating that more than N square-topped pulses $S_w$ are generated during each revolution of drum 1, flip-flop A' will be in its 1-representing state for greater periods of time than in its 0-representing state thereby producing output signals A having a positive average value proportional to the difference in repetition rate of the two signals. On the other hand, if count selection pulses $S_p$ have a greater repetition rate than origin pulses $O_p$, indicating that less than N square-topped pulses $S_w$ are generated during each revolution of drum 1, flip-flop A' will be in its 0-representing state for greater periods of time than in its 1-representing state. As a result signals A will have an average negative value proportional to this difference in repetition rate.

When the repetition rate of origin pulses $O_p$ is the same as the repetition rate of count selection pulses $S_p$, the average value of signals A, and hence the value of correction voltage $A_v$, may or may not have a zero value depending upon the relative time of occurrence of the origin pulses and the corresponding count selection pulses. For example, assume that each count selection pulse $S_p$ occurs in time coincidence with a corresponding origin pulse $O_p$. Under these conditions, it is apparent from the previous discussion relating to characteristics of a conventional flip-flop, that flip-flop A' will be alternately triggered to its opposite state at the completion of each revolution of drum 1. As a result, signals A will be symmetrical signals having alternately 1-level and 0-level values and correction voltage $A_v$ will be zero. Similarly, if it is assumed that each count selection pulse $S_p$ occurs at the midpoint in time between two consecutive origin pulses $O_p$, flip-flop A' again alternately assumes each of its two stable states for equal periods of time thereby producing output signals A having an average value, as represented by voltage $A_v$, of 0.

On the other hand, if the relative time occurrence of pulses $S_p$ and $O_p$ are other than above, i.e., each $S_p$ pulse neither occurs in time coincidence with an $O_p$ pulse nor midway between two consecutive $O_p$ pulses, the average value $A_v$ of signals A will not be zero even though the repetition rate of both pulses $S_p$ and $O_p$ is the same. For example, if each $S_p$ pulse occurs somewhere between the midpoint and the first of two consecutive $O_p$ pulses, signals A will be asymmetrical resulting in a negative correction voltage $A_v$. This is evident when it is realized that flip-flop A' will be triggered to its 1-representing state by each $O_p$ pulse for a period of time less than one-half the time for a revolution of drum 1 as indicated by the period between successive $O_p$ pulses, but will be triggered to its 0-representing state by each $S_p$ pulse for a period greater than one-half a revolution of the drum. Conversely, if each $S_p$ pulse occurs at some time between the midpoint and the second of two consecutive $O_p$ pulses, correction voltage $A_v$ will have a positive value since flip-flop A' will be in its 1-representing state during each revolution of drum 1 for more than one-half the revolution and in its 0-representing state for less than one-half of the revolution.

In summary therefore the frequency control circuit is operative to control the signal generator of the present invention by developing a correction signal of the proper amplitude and polarity to cause the frequency of square-topped pulses $S_w$, developed by the signal generator, to be altered until the repetition rate of count selection pulses $S_p$ and origin pulses $O_p$ is the same and each $S_p$ pulse occurs either in time coincidence with a corresponding $O_p$ pulse or occurs exactly midway in time between two consecutive $O_p$ pulses. In this manner, the repetition rate of pulses $S_w$ is altered until exactly N square-topped $S_w$ pulses are developed during each revolution of drum 1.

The above described interaction of the frequency control circuit and signal generator of the present invention may be more clearly understood by a closer scrutiny of the wave forms of the signal heretofore discussed associated with the signal generator and the frequency control circuit. Accordingly, reference is made to Fig. 2 wherein a wave form chart is presented illustrating the voltage wave shapes at various points in the frequency control circuit and signal generator of Fig. 1 plotted as a function of time.

Figure 2:
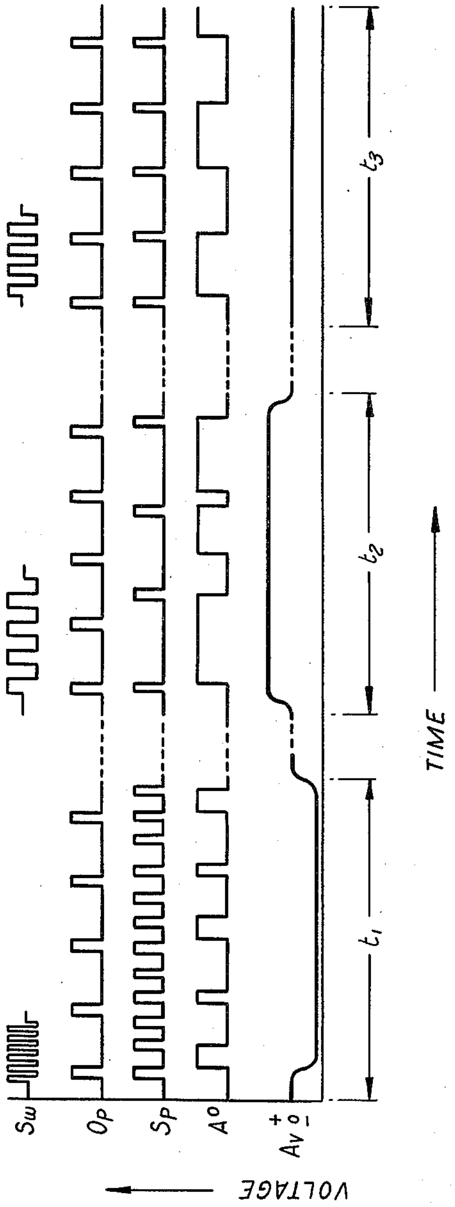
Fig. 2 is a chart of the voltage wave forms associated with specific portions of the frequency control circuit of the recording apparatus illustrated in Fig. 1.

Each signal illustrated in Fig. 2 is identified by a symbol at the extreme left end which directly corresponds to the reference symbol utilized in Fig. 1 to identify the corresponding signal. For example, square-topped pulses $S_w$ appearing at the output of pulse shaping network 21 of Fig. 1 are illustrated on line $S_w$ of the wave chart.

It is noted by an examination of the chart of Fig. 2 that signals A, representing the output signals of flip-flop A′ of Fig. 1, are illustrated as they appear, having successive 1-level values and 0-level values, with an additional reference line representing the zero level above and below which the average values of the signals may be compared. The control voltage $A_v$, produced by the averaging circuit 26 of Fig. 1, is illustrated in the wave chart as having a negative value for a first interval of time labeled $t_1$, a positive value for a second interval of time $t_2$, and a zero value for a third time interval $t_3$. Each of the time intervals $t_1$ to $t_3$ represents a time interval corresponding to a different repetition rate of square-topped pulses $S_w$. For example, time interval $t_1$ corresponds to a period during which pulses $S_w$ have a repetition rate greater than the desired repetition rate, i.e., wherein count selection pulses $S_p$ have a repetition rate greater than origin pulses $O_p$. During time interval $t_2$, pulses $S_w$ have a repetition rate less than the desired repetition rate as evidenced by pulses $S_p$ having a lower repetition rate than pulses $O_p$. Time interval $t_3$ corresponds to a period wherein pulses $S_w$ are of exactly the desired repetition rate and wherein each $S_p$ pulse occurs in time coincidence with a corresponding $O_p$ pulse.

From Fig. 1, it is seen that flip-flop A′ is triggered to the 1-representing and the 0-representing states, respectively, in response to positive pulses $O_p$ and $S_p$. It is further known that the flip-flop is triggered to the opposite state in response to the simultaneous application of both an $O_p$ pulse and an $S_p$ pulse. Although the operation of the present invention need not be so limited, it is herein assumed that a flip-flop, such as flip-flop A′, is actually triggered in response to the trailing edge of a positive triggering pulse. Thus signals A of the voltage chart of Fig. 2, are illustrated as changing from 0-level signals to 1-level signals coincident in time with the trailing edge of an $O_p$ pulse and as changing from 1-level to 0-level signals coincident in time with the trailing edge of an $S_p$ pulse.

Since selection pulses $S_p$ have a repetition rate greater than origin pulses $O_p$ during time interval $t_1$, flip-flop A′ is in its 0-representing state for greater intervals of time than in its 1-representing state. As a result, output signals A of flip-flops A′ have characteristics as appear in the waveform chart wherein the signals have 0-levels for greater intervals than 1-levels. During time period $t_2$, count selection pulses $S_p$ have a repetition rate less than the repetition rate of origin pulses $O_p$, causing signals A to appear as illustrated for this period. Since the repetition rates of origin pulses $O_p$ and selection pulses $S_p$ are the same during period $t_3$ and in addition each $O_p$ pulse occurs coincident in time with a corresponding $S_p$ pulse, output signals A are symmetrical, i.e., are alternately 1-level and 0-level signals for equal intervals of time.

Utilizing the 0 reference line of the voltage chart for signals A, the corresponding average values $A_v$ for each of the time intervals $t_1$ to $t_3$ are readily apparent. For example, during period $t_1$, the average value of signals A, represented by correction voltage $A_v$, has a negative polarity. During time interval $t_2$, the average value $A_v$ of signals A has a positive value as indicated. During time interval $t_3$, however, correction voltage $A_v$ has a 0 value since signals A during this period have alternate 1-level and 0-level values for equal intervals of time.

The circuit of Fig. 1 described thus far relates to that portion of the recording apparatus of the present invention for generating and recording on timing track 10 of drum 1 substantially rectangular clock pulses having a repetition rate such that a timing track of exactly N clock pulses is recorded on the drum during each revolution thereof. In operation, the signal generator and automatic frequency control circuit rapidly interact in the manner described to stabilize the repetition rate of pulses $S_w$ to produce exactly N square-topped pulses $S_w$ during each revolution of the drum. If it is desired, however, to determine the moment when stability is achieved, an oscilloscope may be utilized for observing signals A to determine when the signals are symmetrical, or in the alternative, a sensitive volt meter may be used for measuring the correction voltage $A_v$ to determine when the voltage has a zero value.

The coincidence detection circuit of the recording apparatus of the present invention is utilized for determining the overlap of the timing track recorded on drum 1 during each revolution of the drum and for automatically interrupting the recording of the timing track when a continuous timing track with in-phase overlap has been recorded during two consecutive revolutions of the drum. As previously mentioned, this is accomplished by developing a binary control signal C which is impressed on clock gate 14 for selectively gating pulses $S_w$ to produce pulses $C_p$. Specifically, clock gate 14 gates pulses $S_w$ in response to a 1-level C signal and blocks pulses $S_w$ in response to a 0-level C signal.

The coincidence detection circuit comprises a coincidence detector 30, a first and a second bistable flip-flop B′ and C′, a logical "and" circuit 34, a start switch S, a battery 32, and may include a phase shifting circuit 31 although the latter may be omitted. Both origin pulses $O_p$ and square topped pulses $S_w$ are impressed on coincidence detector 30, pulses $S_w$ being directly impressed thereon and pulses $O_p$ being impressed thereon by phase shifting circuit 31.

Coincidence detector 30 is a typical coincidence circuit in which an output signal or pulse is obtained only when suitable input pulses appear simultaneously at each of a plurality of inputs. Thus in the instant case, coincidence detector 30 produces a coincidence pulse $C_{dp}$ whenever an origin pulse $O_p$ and a square-topped pulse $S_w$ are simultaneously impressed on the inputs thereof. Typical coincidence circuits, suitable for operation as coincidence detector 30, are fully described and illustrated in "Electronics Experimental Techniques," by William C. Elmore and Matthew Sands, published by McGraw-Hill Book Company, Inc., 1949, pages 120 to 123.

Coincidence pulses $C_{dp}$, produced by coincidence detector 30, are simultaneously applied to the 1-input of flip-flop B′ and to a first input of logical "and" circuit 34. When the switch S is in its non-activated state, as shown in the figure, origin pulses $O_p$ are applied to the 0-input of flip-flop B′. Output signals B of flip-flop B′ are applied to a second input of logical "and" circuit 34.

Logical "and" circuit 34 is a typical logical "and" circuit well known in the art having a plurality of separate inputs and a single output and responsive to binary input signals applied to the separate inputs for producing a 1-level output signal on the single output when all the input signals are simultaneously 1-representing signals, and for producing a 0-level output signal when at least one of the input signals is a 0-level signal. Typical logical "and" circuits, such as circuit 34 are fully described and illustrated in "High-Speed Computing Devices" by Engineering Research Associates, published in 1950 by McGraw-Hill Book Company, Inc., New York and London; in an article entitled "Diode Coincidence and Mixing Circuits in Digital Computers" by Tung Chang Chen, in volume 38 of the Proceedings of the IRE on pages 511 through 514; and in U.S. Patent No. 2,644,887 entitled "Synchronizing Generator" by A. E. Wolfe, Jr., issued July 7, 1953.

It should be noted at this time, that clock gate 14 may be a logical "and" circuit similar to logical "and" circuit 34. However, in order to provide the best engineering design it is preferred to use a special type of clock gating circuit as clockgate 14. Such a gating circuit is fully described and claimed in "Diode, Pulse-Gating Circuits" by Richard D. Forrest, Serial No. 327,133, filed December 20, 1952, which is assigned to the same assignee as the present application.

Logical "and" circuit 34 has its inputs coupled to coincidence detector 30 and bistable flip-flop B′ and is responsive to coincidence pulses $C_{dp}$ and signals B for gating pulses $C_{dp}$ to produce gated pulses $B.C_{dp}$ in response to 1-level B signals and for blocking pulses $C_{dp}$ in response to 0-level B signals. Gated pulses $B.C_{dp}$ are applied to the 0-input of flip-flop C′, the 1-input of flip-flop C′ being disconnected from the remaining circuitry when switch S is in its non-activated position as shown. Output signals C, produced by flip-flop C′ constitute the control signals produced by the coincidence detection circuit and are impressed on clock gate 14.

The coincidence detection circuit of the present invention operates as follows. When the repetition rate of pulses $S_w$ produced by the signal generator has been stabilized by the frequency control circuit to cause exactly N square-topped $S_w$ pulses to be produced during each revolution of drum 1, start switch S is activated by momentarily depressing it to put in operation the coincidence detection circuit. When switch S is thus activated, a potential developed by battery 32 is simultaneously applied to the 0-input of flip-flop B′ and the 1-input of flip-flop C′ thereby setting flip-flops B′ and C′ to the 0-representing and 1-representing states, respectively. Signals B, produced by flip-flop B′, are therefore 0-level signals, and signals C, produced by flip-flop C′ are accordingly 1-level signals. As a consequence, "and" gate 34 is closed and clock gate 14 is opened. Accordingly, pulses $S_w$ are continuously recorded in the form of clock pulse signals $C_{ps}$, on timing track 10 of drum 1.

When a first coincidence pulse $C_{dp}$ is produced by coincidence detector 30, flip-flop B′ is triggered to its 1-representing state. As a result, output signal B of flip-flop B′ becomes a 1-level signal thereby opening gate 34. Since switch S has now returned to the non-activated position the succeeding origin pulse $O_p$ is impressed on the 0-input of flip-flop B′. Flip-flop B′ is therefore triggered back to the 0-representing state as a result of the second origin pulse irrespective of whether or not a second coincidence pulse $C_{dp}$ is produced by coincidence detection circuit 30. If a second coincidence pulse $C_{dp}$ is produced, however, indicating that two consecutive origin pulses have been received by coincidence detector 30 in phase with two corresponding $S_w$ pulses, the second $C_{dp}$ pulse is gated by gate 34 to form a gated $B.C_{dp}$ pulse at the same time that flip-flop B′ is triggered from its 1 to its 0-representing state. Pulse $B.C_{dp}$, applied to the 0-input of flip-flop C′, triggers the flip-flop to the 0-representing state thereby causing control signals C to be 0-level signals. Clock gate 14 is therefore closed, thus interrupting the recording of clock pulses of timing track 10.

If no coincidence pulse $C_{dp}$ is produced by coincidence detector 30 in response to the second origin pulse, however, the coincidence detection circuit returns to its original state as existing immediately after the activation of switch S wherein flip-flops B′ and C′ are respectively in the 0-representing and the 1-representing states. It is apparent therefore that two coincidence pulses $C_{dp}$ corresponding to two consecutive origin pulses $O_p$ must be produced before flip-flop C′ is triggered to its 0-representing state thereby closing clock gate 14. In this manner, the coincidence detection circuit interrupts the recording of clock pulses on timing track 10 when a timing track having in-phase overlap is recorded on the drum for two successive revolutions.

As previously noted phase shifting circuit 31 may be included in the circuit of Fig. 1 although not necessary to the function thereof. Where included, phase shifting circuit 31 is utilized to aid in obtaining the desired coincidence between origin pulses $O_p$ and corresponding square-topped pulses $S_w$. This may become necessary where the ratio of the repetition rate of pulses $S_w$ to the repetition rate of pulses $O_p$ is comparatively low, i.e., when N represents a comparatively small number. However, in the usual case, wherein N is a comparatively large number, phase shifting circuit 31 becomes unnecessary, the required coincidence normally occurring.

Having described the operation and structure of the coincidence detection circuit of the timing track recording apparatus illustrated in Fig. 1, it is advantageous at this time to consider more closely the wave forms of the signals heretofore discussed before proceeding further. Accordingly, reference is made to Fig. 3 wherein a wave form chart is presented illustrating the voltage wave shapes plotted as a function of time at various points in the coincidence detection circuit of the apparatus of Fig. 1.

Figure 3:
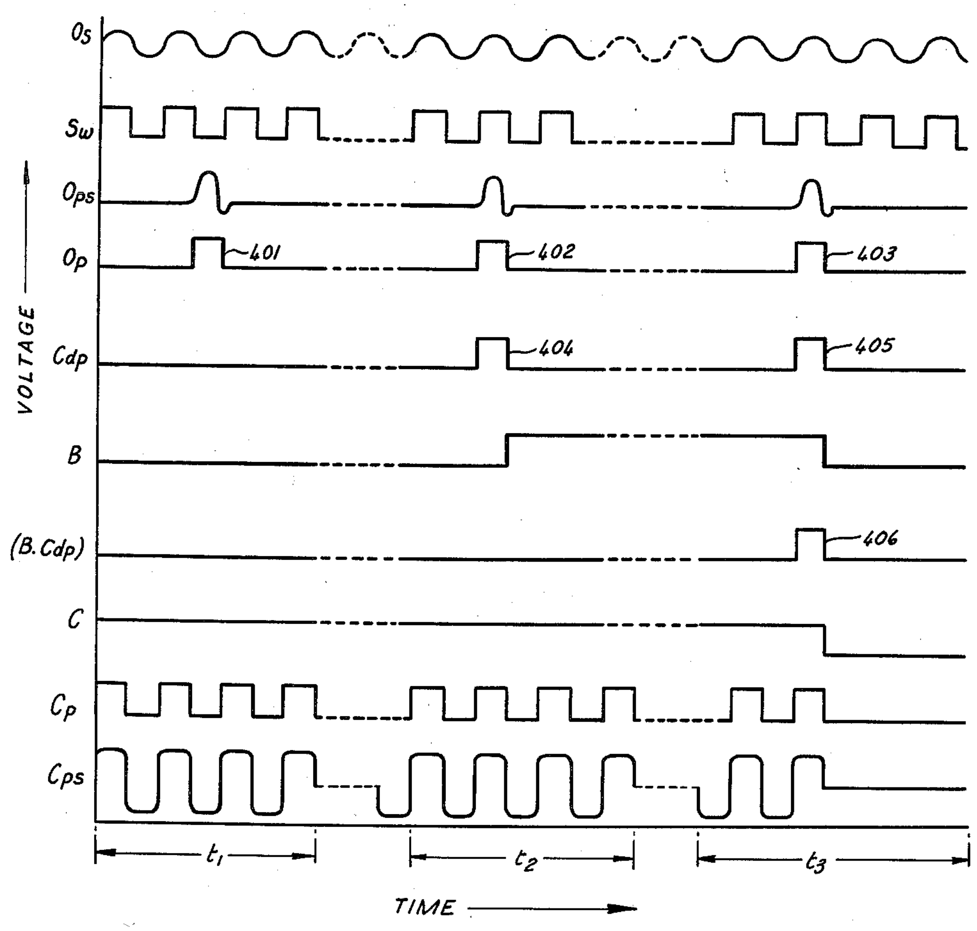
Fig. 3 is a chart of the voltage wave forms associated with specific portions of the coincidence detection circuit and the recording circuit of the recording apparatus illustrated in Fig. 1.

Similar to Fig. 2, each signal in the wave form chart of Fig. 3 is identified by a symbol at the extreme left end of the signal which directly corresponds to the reference symbol utilized in Fig. 1 to identify the corresponding signal. For example square-topped pulses $S_w$ and origin pulses $O_p$ impressed on coincidence detector 30 of Fig. 1, are illustrated on lines $S_w$ and $O_p$, respectively, of the wave form chart. In a similar manner the remaining signals illustrated in the wave form chart are readily identified by reference to Fig. 1.

In addition to the signals specifically associated with the coincidence detection circuit, signals identified with other portions of the recording apparatus of Fig. 1 are included in the wave form chart for greater clarity. For example, sine waves $O_s$ produced by oscillator 20, clock pulses $C_p$ developed by clock gate 14, clock pulse signals $C_{ps}$ produced by writing circuit 15, and origin pulse signals $O_{ps}$ produced by reading head 20, are also included.

It is noted that the chart of Fig. 3 is divided into three separate sections identified as $t_1$, $t_2$, and $t_3$, respectively. Sections $t_1$ to $t_3$ correspond to time intervals representing the terminal portions of three consecutive revolutions of drum 1 immediately following the activation of start button S and including $O_p$ pulses 401, 402, and 403. During time interval $t_1$, it is assumed that the corresponding origin pulse 401 does not occur in phase with a square-topped pulse $S_w$. During time intervals $t_2$ and $t_3$, however, the corresponding origin pulses 402, 403 occur in phase with corresponding $S_w$ pulses as illustrated. Accordingly, no coincidence pulse $C_{dp}$ is produced during time intervals $t_1$, but coincidence pulses 404, 405 are produced during intervals $t_2$, $t_3$. Flip-flop B′, therefore, is in its 0-representing state during time interval $t_1$, is triggered to its 1-representing state by the simultaneous application of origin pulse 402 and coincidence pulse 404 during time interval $t_2$, and is returned to its 0-representing state during time interval $t_3$ by the simultaneous application of origin pulse 403 and coincidence pulse 405 to the flip-flop.

Logical "and" gate 34 of Fig. 1 is closed, therefore, during all of time interval $t_1$ and for part of time interval $t_2$ including the time when coincidence pulse 404 is produced. Gate 34 is opened, however, during a period beginning with the trailing edge of pulse 404 and ending with the trailing edge of pulse 405. As a consequence, only coincidence pulse 405 is gated by gate 34 to produce a gated $B.C_{dp}$ pulse 406 during time interval $t_3$. Flip-flop C', therefore, remains in the 0-representing state, as set by activating start switch S, until it is triggered to the 1-representing state during interval $t_3$ by gated pulse 406. Accordingly, control signal C appears as illustrated having a 1-level value during all of time intervals $t_1$ and $t_2$ and during time interval $t_3$ up to the time of the trailing edge of gated pulse 406. Clock pulses $C_p$ are therefore continuously developed by clock gate 14 from the moment that start switch S is activated up to the moment of completion of the third revolution of the drum as marked by the third origin pulse 403. Consequently, clock pulse signals $C_{ps}$ are continuously recorded on the drum by clock recording head 16 during this period. The recording of clock pulse signals $C_{ps}$ on timing track 10 of the drum are interrupted at the end of the third revolution of the drum, as illustrated in the wave chart, to preserve the continuous timing track with in-phase overlap that was recorded during the third revolution.

As has been previously explained, and as is well known to those skilled in the art, the majority of the components utilized in the apparatus of Fig. 1 are conventional electronic components. Specifically, reactance-tube controlled oscillators, pulse shaping networks, coincidence circuits, gating circuits, logical "and" circuits, reading and writing circuits, magnetic reading and recording heads, phase shifting circuits, filtering or averaging circuits, and bistable flip-flops are all conventional electronic circuitry well known in the art. Further detailed consideration of the structure of these circuits is therefore obviously unnecessary. However, the structure of counter 24 and count selector 25 remains to be considered in more detail.

Figure 4:
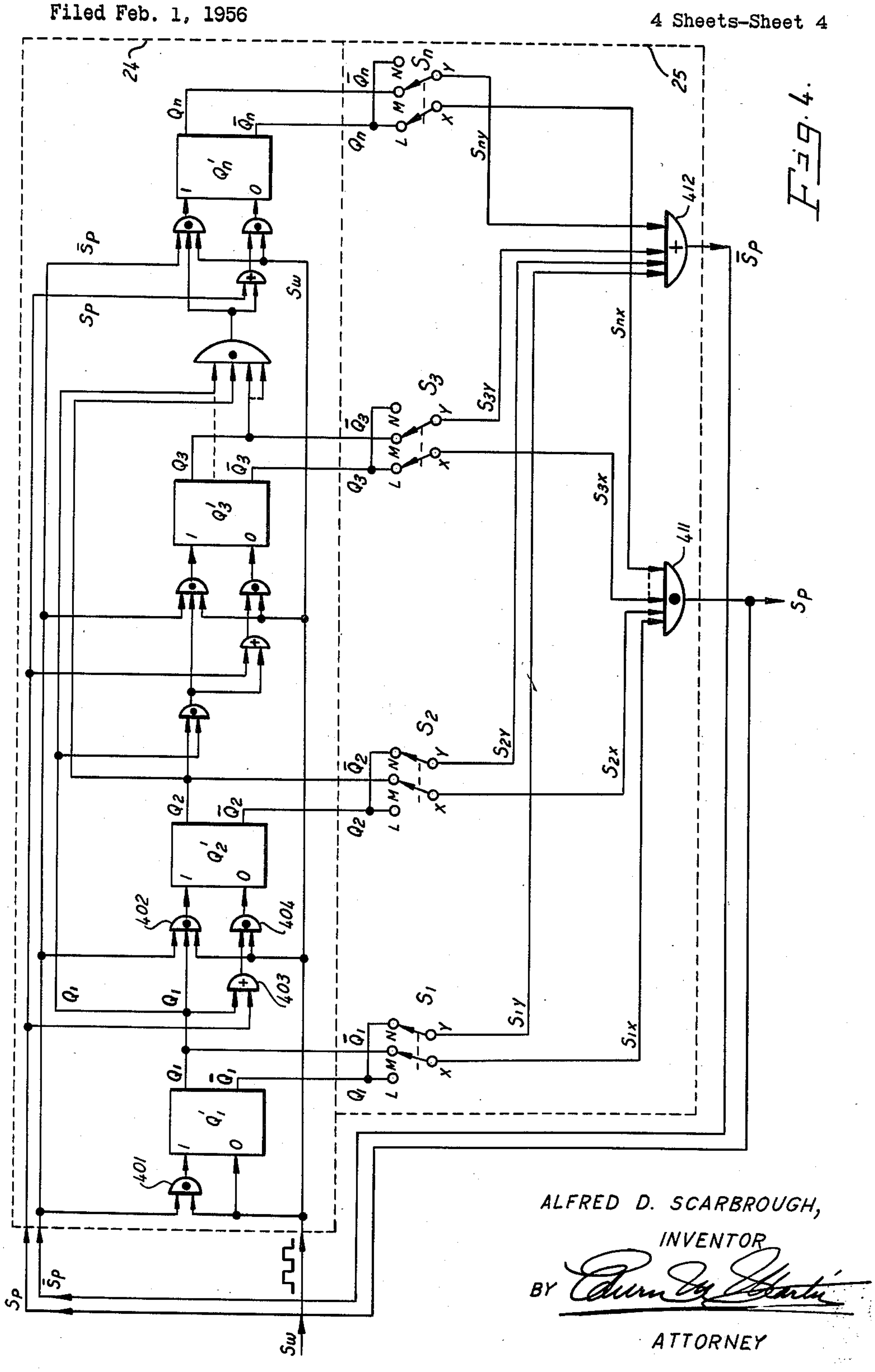
Fig. 4 is a schematic circuit diagram, partially in block form, illustrating in greater detail the counter and count selection circuit of Fig. 1.

Accordingly, reference is now made to Fig. 4 wherein there is illustrated in detail a counter 24 and a count selection circuit 25, both enclosed by dotted lines, suitable for operation in the apparatus of Fig. 1. As previously mentioned, counter 24 of Fig. 1 may be any conventional counter capable of counting square-topped pulses $S_w$ impressed thereon and producing complementary pairs of binary output signals $Q_1$, $\bar{Q}_1$; $Q_2$, $\bar{Q}_2$; $Q_3$, $\bar{Q}_3$; . . . $Q_n$, $\bar{Q}_n$ indicating, in a true binary or a binary-coded numbering system, the count of the counter. In addition, as was previously mentioned, counter 24 must be capable of counting square wave signals $S_w$ only when signals $S_p$ and $\bar{S}_p$, produced by count selector 25, are respectively 0-level and 1-level signals, counter 24 being reset or recycled to a zero count whenever signals $S_p$ and $\bar{S}_p$ are respectively 1-level and 0-level signals. The specific embodiment of counter 24 illustrated in Fig. 4 is responsive to pulses $S_w$, $S_p$, and $\bar{S}_p$ impressed thereon for producing signals $Q_1$, $\bar{Q}_1$ to $Q_n$, $\bar{Q}_n$ indicating at any instant the count contained in counter 24 at that instant in a true binary numbering system. As is well known in the art, a true binary numbering system may be defined as a numbering system wherein a quantity is represented by a group of binary digits having weights or powers of 2. Accordingly, each binary digit of a group has a weight double that of the immediately lesser order or lesser significant binary digit and one-half that of the immediately greater order binary digit of the group.

As shown in Fig. 4, counter 24 comprises a series of conventional bistable flip-flops $Q_1'$, $Q_2'$, $Q_3'$, . . . $Q_n'$. After each $S_w$ pulse has been applied to counter 24, each of the flip-flops $Q_1'$ to $Q_n'$ stores a single binary digit in a corresponding binary place of the binary number representing the count of the counter. In the counter illustrated, flip-flop $Q_1'$ stores the binary digit corresponding to the least significant binary place, $Q_2'$ stores the next to the least significant binary digit, and so forth; $Q_n'$ storing the most significant binary digit of the binary number representing the count of the counter. Accordingly, a binary 1 stored in flip-flop $Q_1'$ has a weight or significance of 1, a binary 1 stored in flip-flop $Q_2'$ has a weight or significance of 2, a binary 1 stored in flip-flop $Q_3'$ has a weight or significance of 4, and so forth in ascending powers of two with a binary 1 stored in flip-flop $Q_n'$ having a weight or significance of $2^{n-1}$.

As previously mentioned with reference to Fig. 1, conventional bistable flip-flops are characterized as having two stable states and producing complementary true and true-complement binary or two-level output signals whose values at any instant indicate the stable state of the flip-flop. In accordance with the conventions herein employed, 1-level true output signals $Q_1$, $Q_2$, $Q_3$, . . . $Q_n$, produced by flip-flops $Q_1'$, $Q_2'$, $Q_3'$, . . . $Q_n'$ represent respective weights of $2^0$, $2^1$, $2^2$ . . . $2^{n-1}$. Conversely, a 0-level true output signal, such as $Q_k$ of a flip-flop indicates that the flip-flop is storing a binary 0 corresponding to a weight or value of 0.

A true binary flip-flop counter, for counting square-topped pulses $S_w$, wherein the flip-flops of the counter simultaneously assume their succeeding count states upon reception of each count pulse $S_w$, is fully described and claimed in copending U.S. patent application, Serial No. 245,860, for "High-Speed Flip-Flop Counters" by Eldred C. Nelson, filed September 10, 1951. The discussion herein of counter 24 is accordingly brief, emphasis being placed on the manner in which the Nelson counter is modified to be reset or recycled by signals $S_p$ and $\bar{S}_p$ produced by count selector 25 in the manner previously discussed.

In order to facilitate an explanation of the mechanization of counter 24 in relation to the state of flip-flops $Q_1'$ to $Q_n'$ for each count, logical Boolean algebra is utilized to identify the signals applied to the 1 and the 0-inputs of the flip-flops. Logical Boolean algebra, as is well known in the art, is based on binary representation of signal values, and is utilized to indicate the mathematical or physical relationship between various binary signals. There are two basic operations in Boolean algebra, commonly referred to as the logical "and" operation and the logical "or" operation. When signals representing binary values are combined in a logical Boolean function by a logical "and" symbol, it is analogous to applying the signals to separate inputs of a logical "and" circuit. Signal symbols connected in a Boolean equation by a logical "or" symbol are analogous to the application of the signals to the separate inputs of a logical "or" circuit. A logical "and" circuit, as heretofore defined, is a circuit for receiving a plurality of binary input signals and for producing a single output signal having a 1-level value when, and only when, all the input binary signals are simultaneously 1-level signals. A logical "or" circuit may be defined as a circuit responsive to a plurality of binary input signals for producing a single output signal having a 1-level value when at least one of the input signals applied thereto is a 1-level signal. A comprehensive discussion of the application of logical Boolean algebra to the mechanization of logical gating circuitry is found in an article entitled "An Algebraic Theory for Use in Digital Computer Design" by E. C. Nelson, in the "IRE Transactions—Electronic Computers," September 1954, pages 12 to 21, inclusive.

Table I below illustrates the stable states of flip-flops $Q_1'$ to $Q_n'$ corresponding to successive decimal counts of counter 24. In the table, the decimal equivalent counts of the counter appear in the left hand column of the table and the corresponding stable states of the flip-flop are indicated symbolically by 1 and 0 digits in the remaining columns of the table. It is assumed for convenience that flip-flops which may be provided in counter 24 between flip-flops $Q_3'$ and $Q_n'$ are all in their 0-representing state for the decimal equivalent values included in the table.

*Table I*

| Decimal Equivalent | Flip-Flops | | | | |
|---|---|---|---|---|---|
| | $Q_1'$ | $Q_2'$ | $Q_3'$ | . . . | $Q_n'$ |
| 0 | 0 | 0 | 0 | . . . | 0 |
| 1 | 1 | 0 | 0 | . . . | 0 |
| 2 | 0 | 1 | 0 | . . . | 0 |
| 3 | 1 | 1 | 0 | . . . | 0 |
| 4 | 0 | 0 | 1 | . . . | 0 |
| 5 | 1 | 0 | 1 | . . . | 0 |
| 6 | 0 | 1 | 1 | . . . | 0 |
| 7 | 1 | 1 | 1 | . . . | 0 |
| : | : | : | : | | : |
| $2^{n-1}$ | 0 | 0 | 0 | . . . | 1 |

Although various symbols have been utilized in the past for representing the logical "and" and the logical "or" functions of a Boolean equation, a dot (.) or parenthesis ( ) is utilized herein to represent the logical "and" function, and a plus sign (+) between signal symbols is exclusively utilized to indicate the logical "or" function. To provide convenient identification of the signals applied to the inputs of the flip-flops of counter 24, the signals applied to the 1-input and the 0-input of a flip-flop will hereinafter be indicated by a 1 and a 0, respectively, followed by the symbol, minus the prime, identifying the flip-flop. For example, the signal applied to the 1-input of flip-flop $Q_1'$ will be identified by a symbol $1Q_1$. Similarly, the signal applied to the 0-input of flip-flop $Q_1'$ will be identified by the symbol $0Q_1$.

From Table I above, it is noted that flip-flop $O_1'$ is triggered to its opposite state upon each succeeding count. Thus, flip-flop $Q_1'$ alternately stores a binary 1 and a binary 0 upon each succeeding count pulse $S_w$ applied to counter 24. Since, as previously explained, a conventional flip-flop is triggered to its opposite state whenever a signal is simultaneously applied to both its 1 and its 0-inputs, an expression representing the triggering function of flip-flop $Q_1'$ may be expressed logically as:

$$1Q_1=0Q_1=S_w$$

A further study of Table I indicates that each of the flip-flops $Q_2'$ to $Q_n'$ is triggered to its opposite state by an $S_w$ pulse only when all flip-flops representing lower order binary digital places of the counter are at that time in their respective 1-representing states. At all other times each of the flip-flops $Q_2'$ to $Q_n'$ are unaffected by a change in count of counter 24. For example, flip-flop $Q_2'$ alters its state on the succeeding pulse whenever $Q_1'$ is now in the 1-representing state, but remains unchanged in state when flip-flop $Q_1'$ is presently in the 0-representing state. Similarly, flip-flop $Q_3'$ is changed to the opposite state as indicated in Table I when flip-flops $Q_1'$ and $Q_2'$ are both presently in their 1-representing states. Thus the logical Boolean equation representing the 1 and 0-input signals to each of the flip-flops $Q_2'$ to $Q_n'$ may be written as:

$$1Q_2=0Q_2=Q_1.S_w$$
$$1Q_3=0Q_3=Q_1.Q_2.S_w$$
$$\vdots$$
$$1Q_n=0Q_n=Q_1.Q_2.Q_3\ .\ .\ .\ Q_{n-1}.S_w$$

Although the above logical Boolean expressions describing the input signals to flip-flops $Q_1'$ to $Q_n'$ of counter 24 satisfy the conditions illustrated in Table I above, the logical expressions must now be modified to include the reset functions provided by signals $S_p$ and $\bar{S}_p$ previously discussed. It has been determined, from the discussion of Fig. 1 that counter 24 must count pulses $S_w$ only so long as signals $S_p$ and $\bar{S}_p$ are respectively 0-representing and 1-representing signals. It was further established that when signals $S_p$ and $\bar{S}_p$ have respective 1-level and 0-level values, counter 24 is reset to a 0 count, i.e., flip-flops $Q_1'$ to $Q_n'$ are all reset to their respective 0-representing states. The above functions describing the input signals to the flip-flops included in counter 24 must incorporate signals $S_p$ and $\bar{S}_p$, therefore, in a manner whereby none of the flip-flops may be triggered to a 1-representing state unless signals $S_p$ and $\bar{S}_p$ are respectively 0-level and 1-level signals. Since signals $S_p$ and $\bar{S}_p$ are complementary, this may be accomplished by incorporating, by a logical "and" function, signal $\bar{S}_p$ in the function describing the signals to the 1-inputs of each of the flip-flops in the counter. Thus the logical functions for the input signals to the flip-flops $Q_1'$ and $Q_n'$, including this additional term, may be expressed as follows:

$$1Q_1=\bar{S}_p.S_w$$
$$0Q_1=S_w$$
$$1Q_2=\bar{S}_p.Q_1.S_w$$
$$0Q_2=Q_1.S_w$$
$$1Q_3=\bar{S}_p.Q_1.Q_2.S_w$$
$$0Q_3=Q_1.Q_2.S_w$$
$$\vdots$$
$$1Q_n=\bar{S}_p.Q_1.Q_2.Q_3\ .\ .\ .\ Q_{n-1}.S_w$$
$$0Q_n=Q_1.Q_2.Q_3\ .\ .\ .\ Q_{n-1}.S_w$$

One of the complementary signals $S_p$ and $\bar{S}_p$ must also be incorporated in the above functions in a manner to cause all of the flip-flops $Q_1'$ to $Q_n'$ be simultaneously triggered to their 0-representing states whenever signals $S_p$ and $\bar{S}_p$ are respectively 1-level and 0-level signals. This may be readily accomplished by adding signals $S_p$, as a logical "or" function, to each of the above functions describing the 0-input signals of the flip-flops $Q_2'$ to $Q_n'$, pulses $S_w$ being always applied to the 0-input of flip-flop $Q_1'$. The resulting logical Boolean equation defining the input signals applied to the 1 and the 0 inputs of each of the flip-flops in counter 24 therefore become:

$$1Q_1=\bar{S}_p.S_w$$
$$0Q_1=S_w$$
$$1Q_2=\bar{S}_p.Q_1.S_w$$
$$0Q_2=(S_p+Q_1)S_w$$
$$1Q_3=\bar{S}_p.Q_1.Q_2.S_w$$
$$0Q_3=(S_p+Q_1.Q_2)S_w$$
$$\vdots$$
$$1Q_n=\bar{S}_p.Q_1.Q_2.Q_3\ .\ .\ .\ Q_{n-1}.S_w$$
$$0Q_n=(S_p+Q_1.Q_2.Q_3\ .\ .\ .\ Q_{n-1})S_w$$

The mechanization of counter 24 from the logical Boolean equations above derived readily follows when it is remembered that each logical "and" function included in an equation is provided in the counter by a corresponding logical "and" circuit. Similarly, each logical "or" function of an equation is provided by a corresponding logical "or" circuit in the counter.

Each logical "and" circuit in counter 24 is symbolically indicated in Fig. 4, as in Fig. 1, by a semi-circle with a dot (.). Each logical "or" circuit of the counter is represented symbolically by semi-circle with a plus (+) in the symbol. For example, the "and" function $\bar{S}_p.S_w$ defining the input signals $1Q_1$ of flip-flops $Q_1'$ is mechanized in the counter 24 by a logical "and" circuit for 401 for receiving signals $\bar{S}_p$, $S_w$ and for providing output signals which are impressed on the 1-input of flip-flop $Q_1'$. A logical "and" circuit 402, for receiving input signals $\bar{S}_p$, $Q_1$, $S_w$, and for producing output signals which are impressed on the 1 input of flip-flop $Q_2'$, is provided for satisfying the logical "and" function $\bar{S}_p.Q_1.S_w$ defining the input signals $1Q_2$ of flip-flop $Q_2'$. The logical equation defining signals $0Q_2$ which are impressed on the 0 input of flip-flop $Q_2'$, may be analyzed as an "or" function $S_p+\bar{Q}_1$ and an "and" function combining the signals $S_p+\bar{Q}_1$ with signals $S_w$. In mechanizing the above function, therefore, a logical "or" circuit 403 is provided for receiving signals $S_p$, $Q_1$ and for providing output signals which are applied to a first input of a logical "and" circuit 404. Signals $S_w$ are applied to a second input of a logical "and" circuit 404, the output signals of logical "and" circuit 404 being directly applied to the 0 input of flip-flop $Q_2'$.

In a similar manner, the remaining logical equations defining the input signals to flip-flops $Q_3'$ to $Q_n'$ of counter 24 are satisfied by logical "and" circuits and logical "or" circuits provided in the counter 24 of Fig. 4. Since the mechanization of the remaining functions directly follows from an examination of the corresponding logical equations, further explanation of the mechanization of counter 24 is therefore deemed unnecessary.

Count selection circuit 25 is provided for receiving signal $Q_1$, $\bar{Q}_1$ to $Q_n$, $\bar{Q}_n$ produced by counter 24, and for producing complementary output signals $S_p$ and $\bar{S}_p$ when a count of N is registered in counter 24. As previously explained in connection with Fig. 1, the count of counter 24 for producing complementary signals $S_p$ and $\bar{S}_p$ is selectively determinable by count selection circuit 25. More specifically, count selector 25 is adjustable to produce 1 and 0-level $S_p$ and $\bar{S}_p$ signals at any desired count N of counter 24, and respective 0-level and 1-level $S_p$, $\bar{S}_p$ signals at all other counts, including 0, of the counter, wherein N is the desired number of clock pulses to be recorded on the timing track of the drum. This is accomplished by providing a set of double-pole, double-throw selector switches $S_1$ to $S_n$, each having stationary contacts L, M, and N and a pair of movable contacts X and Y. Movable contacts X, Y of each switch are joined to move in unison, i.e., are adjustable to either contact respectively stationary contacts L, M or stationary contacts M, N.

Each of the true output signals $Q_1$ to $Q_n$ developed by counter 24 is directly applied to the stationary M contact of an associated one of the switches $S_1$ to $S_n$ of count selector 25. For example, output signal $Q_1$ is applied to the M contact of switch $S_1$, output signal $Q_2$ is applied to the M contact of switch $S_2$, and so forth, output signal $Q_n$ being applied to the M contact of switch $S_n$.

Each of the true-complement output signals $\bar{Q}_1$ to $\bar{Q}_n$ of the counter are applied to both the L and N stationary contacts of an associated switch. Thus signals $\bar{Q}_1$ are applied to both the L and N contacts of switch $S_1$, signals $\bar{Q}_2$ are applied to both the L and N contacts of switch $S_2$, and so forth.

The X movable contacts of switches $S_1$ to $S_n$ are connected to corresponding separate inputs of a logical "and" circuit 411, and the Y movable contact of the switches are connected to corresponding separate inputs of a logical "or" circuit 412. Count selection pulses $S_p$ are derived from the output of logical "and" circuit 411, and the complementary output pulses $\bar{S}_p$ are derived from the output of the logical "or" circuit 412. For convenience, the signals appearing on the X movable contacts of switches $S_1, S_2, S_3 \ldots S_n$ are respectively designated $S_{1x}, S_{2x}, S_{3x} \ldots S_{nx}$. In a similar manner, the signals appearing on the Y movable contact of the above switches are respectively designated as signals $S_{1y}, S_{2y}, S_{3y}, \ldots S_{ny}$. In accordance with Boolean algebra, therefore, count selection signals $S_p$ and $\bar{S}_p$ may be defined by the logical function:

$$S_p=S_{1x}\cdot S_{2x}\cdot S_{3x}\cdot \ldots S_{nx}$$

$$\bar{S}_p=S_{1y}+S_{2y}+S_{3y}+\ldots+S_{ny}$$

A 1-level $S_p$ signal or pulse is produced in accordance with the above function, therefore, whenever signals $S_{1x}$ to $S_{nx}$ are all simultaneously 1-level signals, signal $S_p$ having a 0-level value whenever any one or more of the signals $S_{1x}$ to $S_{nx}$ has a 0-level value. Conversely, a 1-level $\bar{S}_p$ signal is produced whenever any one or more of the signals $S_{1y}$ to $S_{ny}$ has a 1-level value, and a 0-level $\bar{S}_p$ signal is produced only when all of the signals $S_{1y}$ to $S_{ny}$ are simultaneously 0-level signals. Since, for any setting of switches $S_1$ to $S_n$, signals $S_{1x}$ to $S_{nx}$ are complementary to signals $S_{1y}$ to $S_{ny}$ for all possible counts contained in counter 24, it is apparent that signals $S_p$ and $\bar{S}_p$ are always complementary signals. It is also evident that the values of signals $Q_1$, $\bar{Q}_1$ to $Q_n$, $\bar{Q}_n$ developed by counter 24 required for producing respective 1-level and 0-level $S_p$ and $\bar{S}_p$ signals, i.e., the reset values of signals $S_p$, $\bar{S}_p$, is dependent upon the setting of switches $S_1$ to $S_n$.

By way of illustration, assume that it is desired to produce the reset values of a 1-level $S_p$ signal and a 0-level $\bar{S}_p$ signal at a particular count N of counter 24 represented by flip-flops $Q_1'$, $Q_2'$, $Q_3'$ and $Q_n'$ storing respectively binary 1, 1, 0, and 0. True output signals $Q_1$, $Q_2$, $Q_3$, and $Q_n$ will therefore have respective values of 1, 1, 0, and 0; and true complement output signals $\bar{Q}_1$, $\bar{Q}_2$, $\bar{Q}_3$ and $\bar{Q}_n$ will have respective values of 0, 0, 1, and 1. From the logical equations for signals $S_p$, $\bar{S}_p$, it is seen that in order to obtain a 1-level $S_p$ and a 0-level $\bar{S}_p$ signal, signals $S_{1x}$ to $S_{nx}$ must be all 1-level signals and signals $S_{1y}$ to $S_{ny}$ must be all 0-level signals. To accomplish this at the above count of counter 24, signals $S_{1x}$, $S_{2x}$, $S_{3x}$, and $S_{nx}$ must be obtained from signals $Q_1$, $Q_2$, $\bar{Q}_3$, and $\bar{Q}_n$, respectively; and signals $S_{1y}$, $S_{2y}$, $S_{3y}$, and $S_{ny}$ must be obtained from signals $\bar{Q}_1$, $\bar{Q}_2$, $Q_3$ and $Q_n$, respectively. This is achieved by adjusting switches $S_1$ to $S_n$ to the position illustrated in the figure wherein the movable X and Y contacts of each of the switches $S_1$, $S_2$, are adjusted to be in contact with stationary contacts B and C, respectively, and wherein the movable X and Y contacts of each of the switches $S_3$, $S_n$ are adjusted to be in contact with stationary contacts A and B, respectively. As a result, output signals $S_p$, produced by logical "and" circuit 411 has a 0-level value at all times except when counter 24 registers the count of N at which time signals $S_p$ has a 1-level value, and conversely, signal $\bar{S}_p$ has a 1-level value at all times except at the count of N when signals $\bar{S}_p$ has a 0-level value.

In conclusion, therefore, there has been disclosed an apparatus for accurately and reliably recording N clock pulses with in-phase overlap on the timing track of a rotating memory drum. It has been shown that the recording apparatus of the present invention is completely automatic in operation, free from mechanical errors, and rapid and reliable in operation. It has also been demonstrated that the timing track recording apparatus of the present invention is adapted to record a timing track of N desired clock pulses with in-phase overlap that is free from time modulation irrespective of irregularity in the angular velocity of the rotating drum.

What is claimed as new is:

1. An automatic timing track recorder for recording a timing track having N desired clock pulses with in-phase overlap on a rotating recording drum; said recorder comprising: first means coupled to the rotating drums for producing an origin pulse at the completion of each revolution thereof; second means for continuously generating clock pulses, said second means being responsive to a control voltage for varying the frequency of said clock pulses according to the amplitude and polarity of said control voltage; third means coupled to said first and second means and responsive to said origin pulses and said clock pulses for comparing the frequency of said origin pulses with the frequency of every Nth pulse of said clock pulses to produce said control voltage at an amplitude and polarity equal to the magnitude and sense, respectively, of the difference between the frequency of said origin pulses and the frequency of said Nth clock pulses to cause said second means to generate said Nth clock pulses at the exact same frequency of said origin pulses; fourth means coupled to said first and second means and responsive to said origin pulses and said clock pulses for producing an in-phase signal when there occurs an exact in-phase relationship between said origin pulses and corresponding pulses of said clock pulses; and fifth means coupled to said second means, said fourth means, and the rotating drum and responsive to said clock pulses for continuously recording said clock pulses on the drum and responsive to said in-phase signal for interrupting said recording of clock pulses to preserve the previously recorded timing track containing N clock pulses with in-phase overlap.

2. A recording system for automatically recording a timing track having N clock pulses with in-phase overlap on a rotating recording drum; said recording system comprising: a drum revolution indicator coupled to the recording drum for producing a revolution signal at the completion of each revolution thereof; a signal generator for generating clock pulses, said signal generator being responsive to a correction signal for varying the frequency of said clock pulses in accordance with the amplitude and polarity of said correction signal; a frequency control circuit coupled to said drum revolution indicator and said signal generator and responsive to said revolution signals and said clock pulses for developing said correction signal at an amplitude and polarity equal to the magnitude and sense of the difference between the repetition rate of said revolution signals and the repetition rate of every Nth pulse of said clock pulses; a coincidence circuit coupled to said drum revolution indicator and said signal generator and responsive to said revolution signals and said clock pulses for producing an in-phase signal when there is an in-phase coincidence between said revolution signals and corresponding pulses of said clock pulses; and a recording circuit coupled to said signal generator, said coincidence circuit and the rotating drum for continuously recording said clock pulses on the rotating drum and for interrupting said recording in response to said in-phase signal to obtain the desired timing track having N clock pulses with inphase overlap.

3. The recording system defined in claim 2 wherein said frequency control circuit includes: a counting circuit for counting said clock pulses and for producing a count output pulse every Nth count of said clock pulses, a bistable flip-flop coupled to said counting circuit and having 1 and 0 inputs for receiving, respectively, said revolution signals and said count output pulses and for producing rectangular output signals, and an averaging circuit coupled to said bistable flip-flop and responsive to said rectangular output signals for developing said correction signal having an amplitude and polarity equal to the average value of said rectangular output signals.

4. The recording system defined in claim 2 wherein said coincidence circuit produces said in-phase signal when there is an in-phase coincidence between two consecutive signals of said revolution signals and two corresponding pulses of said clock pulses; and wherein said coincidence circuit includes a coincidence detector responsive to said revolution signals and said clock pulses for producing a coincidence signal each time there is an in-phase coincidence between a revolution signal and a clock pulse, a first bistable flip-flop coupled to said coincidence detector and having 1 and 0 inputs responsive, respectively, to said coincidence signals and said revolution signals for producing first output signals, a logical "and" circuit coupled to said coincidence detector and said first bistable flip-flop and having first and second inputs for receiving said coincidence signals and said first ouput signals, respectively, to produce second output signals, and a second bistable flip-flop coupled to said logical "and" circuit for receiving said second output signals to produce said in-phase signal.

5. An automatic timing track recording apparatus for recording a timing track of N clock pulses with in-phase overlap on a rotating recording drum; said recording apparatus comprising: first means coupled to the rotating drum for producing an origin pulse at the completion of each revolution thereof; second means for generating clock pulses, said second means being responsive to a correction signal for varying the frequency of said clock pulses proportional to the amplitude and polarity of said correction signal, said second means including an oscillator for producing said clock pulses and a reactance circuit coupled to said oscillator and responsive to said correction signal for varying the reactance of said oscillator to cause said oscillator to vary accordingly the frequency of said clock pulses; third means coupled to said first and second means and responsive to said origin pulses and said clock pulses for producing said correction signal at an amplitude and polarity equal to the magnitude and sense of the difference between the repetition rate of said origin pulses and the repetition rate of every Nth pulse of said clock pulses, said third means including a counting circuit for counting said clock pulses and for producing a count output signal every Nth count of said counting circuit, a bistable flip-flop coupled to said counting circuit and having 1 and 0 inputs responsive, respectively, to said origin pulses and said count output signals for producing rectangular signals corresponding to the stable states of said flip-flop, and an averaging circuit coupled to said flip-flop and responsive to said rectangular signals for producing said correction signal at an amplitude and polarity corresponding to the average value of said rectangular signals; fourth means coupled to said first and second means and responsive to said origin pulses and said clock pulses for producing an in-phase signal when there is an in-phase relationship between two consecutive origin pulses and two corresponding clock pulses, said fourth means including a coincidence detector for receiving said origin pulses and said clock pulses and for producing a coincidence signal whenever there is time coincidence between an origin pulse and a clock pulse, a first flip-flop coupled to said coincidence detector and having 1 and 0 inputs responsive respectively to said coincidence signals and said origin pulses for producing first output signals, a logical "and" circuit coupled to said coincidence detector and said first flip-flop and having first and second inputs for receiving said coincidence signals and said first output signals, respectively, to produce second output signals, and a second flip-flop coupled to said logical "and" circuit and responsive to said second output signals for producing said in-phase signal; and fifth means coupled to said second means, said fourth means and the rotating drum for continuously recording said clock pulses on the drum and for interrupting said recording in response to said in-phase signal to obtain the desired timing track.

6. An automatic timing signal recorder for recording discrete timing signals on the timing track of a rotating magnetic drum, having a single origin signal recorded on a separate track thereof indicating each full revolution of said drum, comprising: an origin pulse circuit having a magnetic head adjacent said drum to sense said origin signal and produce an origin pulse once each revolution of said drum; a variable frequency timing signal generator; counter circuit means coupled to said timing signal generator and producing a count signal at a predetermined timing signal count; a bistable electrical circuit responsive to said origin pulse and said count signal and having a single output circuit switched between a first electrical voltage level and a second different voltage level by said count signal and said origin pulse; circuit means connected between said timing signal generator and said bistable circuit and controlling the frequency of said timing signal generator; a magnetic writing head disposed adjacent said timing track of said magnetic drum; a normally open gating circuit connecting said timing signal generator to said writing head providing continuous timing signal recording on said timing track; and coincidence circuit means responsive to said timing signals and said origin pulse, having an output circuit connected to and controlling said gating circuit and operable with the second occurrence of coincidence between a timing signal and said origin pulse to close said gating circuit.

References Cited in the file of this patent

UNITED STATES PATENTS

| | | |
|---|---|---|
| 2,250,284 | Wendt | July 22, 1941 |
| 2,475,742 | Hammond | July 12, 1949 |
| 2,563,647 | Hammond | Aug. 7, 1951 |
| 2,713,677 | Scott et al. | July 19, 1955 |
| 2,801,407 | Lubkin | July 30, 1957 |